(12) United States Patent
Nakajima et al.

(10) Patent No.: US 9,067,240 B2
(45) Date of Patent: Jun. 30, 2015

(54) METHOD FOR MANUFACTURING NEAR-INFRARED REFLECTIVE FILM AND NEAR-INFRARED REFLECTIVE BODY PROVIDED WITH SAME

(75) Inventors: Akihisa Nakajima, Tokyo (JP); Takeo Arai, Tokyo (JP)

(73) Assignee: KONICA MINOLTA HOLDINGS, INC., Tokyo (JP)

( * ) Notice: Subject to any disclaimer, the term of this patent is extended or adjusted under 35 U.S.C. 154(b) by 211 days.

(21) Appl. No.: 13/809,790

(22) PCT Filed: Jul. 6, 2011

(86) PCT No.: PCT/JP2011/065434
§ 371 (c)(1),
(2), (4) Date: Jan. 11, 2013

(87) PCT Pub. No.: WO2012/014644
PCT Pub. Date: Feb. 2, 2012

(65) Prior Publication Data
US 2013/0114132 A1      May 9, 2013

(30) Foreign Application Priority Data

Jul. 24, 2010   (JP) ................................. 2010-166595

(51) Int. Cl.
*B05D 5/06* (2006.01)
*G02B 5/20* (2006.01)
*G02B 5/08* (2006.01)

(52) U.S. Cl.
CPC ................ *B05D 5/063* (2013.01); *G02B 5/208* (2013.01); *G02B 5/08* (2013.01); *G02B 5/0891* (2013.01)

(58) Field of Classification Search
CPC .................................. B05D 5/06; B05D 5/063
USPC .......................................................... 427/162
See application file for complete search history.

(56) References Cited

U.S. PATENT DOCUMENTS

| | | | |
|---|---|---|---|
| 2010/0208349 A1* | 8/2010 | Beer et al. | ...................... 359/580 |
| 2010/0256271 A1* | 10/2010 | Hasegawa et al. | ............ 524/204 |

FOREIGN PATENT DOCUMENTS

| | | | |
|---|---|---|---|
| JP | 2003-266577 | | 9/2003 |
| JP | 2004-125822 Y | | 4/2004 |
| JP | 2005-131937 Y | | 5/2005 |
| JP | 2009-086659 Y | | 4/2009 |
| JP | 2010-053200 Y | | 3/2010 |
| JP | 2010-085532 A | | 4/2010 |
| WO | WO 2008011919 | * | 1/2008 |
| WO | WO 2009078129 | * | 6/2009 |

* cited by examiner

*Primary Examiner* — Elizabeth Burkhart
(74) *Attorney, Agent, or Firm* — Lucas & Mercanti, LLP

(57) ABSTRACT

Disclosed is a method for manufacturing a near-infrared reflective body in which a near-infrared reflective film is manufactured that has excellent manufacturing cost performance, is capable of being employed over a large area, and has excellent application stability and resistance to refractive index unevenness in the surface. A method for manufacturing a near-infrared reflective film in which a high refractive index layer and a low refractive index layer are alternately laminated on a support, wherein the difference in the refractive index of adjacent high refractive index layers and low refractive index layers is at least 0.3, and the near-infrared reflective film is formed using a coating liquid for a high refractive index layer and a coating liquid for a low refractive index layer, if the viscosity of the high refractive index layers and low refractive index layers at 15° C. is $\eta_{15}$ and at 45° C. is $\eta_{45}$, the viscosity ratio ($\eta_{15}/\eta_{45}$) in each case is at least 2.0.

20 Claims, No Drawings

US 9,067,240 B2

METHOD FOR MANUFACTURING NEAR-INFRARED REFLECTIVE FILM AND NEAR-INFRARED REFLECTIVE BODY PROVIDED WITH SAME

CROSS REFERENCE TO RELATED APPLCIATION

This Application is a 371 of PCT/JP2011/065434 filed on Jul. 6, 2011 which, in turn, claimed the priority of Japanese Patent Application No. 2010-166595 filed on Jul. 24, 2010, both applications are incorporated by reference herein.

FIELD OF THE INVENTION

The present invention relates to a method for manufacturing a near-infrared reflective film and a near-infrared reflective body provided with the same which has excellent manufacturing cost performance, is capable of being employed over a large area, and has excellent coating uniformity.

TECHNICAL BACKGROUND

In recent years, due to the growing interest in energy saving, requests have been increasing for the near-infrared reflective film which shields transmission of heat ray of sunlight by equipping the windowpane of the buildings or the vehicles from a viewpoint of reducing the load according to air conditioning equipment.

Conventionally, dry film forming methods such as a vapor deposition method or a sputter method were proposed as the method of producing the near-infrared reflective film in which laminated films were formed by laminating the high refractive index layer and the low refractive index layer by turns. However, since the dry film forming methods need large-sized vacuum equipment, there are issues such that it requires high manufacture cost, and it is difficult to form large area film, and the support is limited to a heat resistant material due to being processed generally at high temperature.

With respect to the above issues, disclosed were methods for forming films by using wet coating methods such as a method of using ultraviolet curable resin (for example, refer to Patent Document 1) or a method for laminating $TiO_2$ sol/ $SiO_2$ sol by turns (for example, refer to Patent Document 2).

However, in the film forming method using ultraviolet curable resin, since the low refractive index layer and the high refractive index layer are repeatedly coated, dried and cured by turns, productivity becomes poor and further due to a convection occurred in the coated layer at a time of drying, there are issues in which the uniformity in plane of each refractive index layers decreases and results in the refractive index unevenness. Similarly in the film forming method using sol, during a process where particles are aggregated to be bound, the uniformity of the refractive index in plane of each refractive index layers decreases and finally results in causing the refractive surface unevenness.

PRIOR TECHNICAL DOCUMENT

Patent Document

Patent Document 1: Unexamined Japanese Patent Application Publication (hereinafter referred to as JP-A) No. 2009-86659
Patent Document 2: JP-A No. 2003-266577

SUMMARY

Problems to be Solved by the Present Invention

In view of the foregoing, the present invention was achieved. An object of the present invention is to provide a method for manufacturing a near-infrared reflective film and a near-infrared reflective body provided with the same which has excellent manufacturing cost performance, is capable of being employed over a large area, has excellent coating stability, excellent resistance to refractive index irregularity in plane of layers and has high film uniformity.

Means to Solve the Problems

The above-mentioned object of the present invention is attained by the following composition.
1. A method for manufacturing a near-infrared reflective film comprising high refractive index layers and low refractive index layers alternately laminated on a support,
   wherein the difference in the refractive index of the adjacent high refractive index layer and the low refractive index layer is at least 0.3, and
   the near-infrared reflective film is formed by using a high refractive index layer coating liquid and a low refractive index layer coating liquid,
   wherein both of the high refractive index layer coating liquid and the low refractive index layer coating liquid have a viscosity ratio ($\eta_{15}/\eta_{45}$) of not less than 2.0,
   wherein $\eta_{15}$ represents a viscosity of the high refractive index layer coating liquid and the low refractive index layer coating liquid at 15° C. and $\eta_{45}$ represents a viscosity of the high refractive index layer coating liquid and the low refractive index layer coating liquid at 45° C.
2. The method for manufacturing the near-infrared reflective film of item 1, wherein the high refractive index layer coating liquid and the low refractive index layer coating liquid has the viscosity ratio ($\eta_{15}/\eta_{45}$) of not less than 100.
3. The method for manufacturing the near-infrared reflective film of item 1 or 2, wherein the high refractive index layer contains a rutile type Mania sol as a metal oxide.
4. The method for manufacturing the near-infrared reflective film of any one of items 1 to 3, wherein the high refractive index layer contains an amino acid having an isoelectric point of not more than 6.5.
5. The method for manufacturing the near-infrared reflective film of any one of items 1 to 4, wherein both of the high refractive index layer coating liquid and the low refractive index layer coating liquid contain a polysaccharide thickener or a gelatin.
6. A near-infrared reflective body comprising the near-infrared reflective film manufactured by the method of any one of items 1 to 5 on at least one side of the substrate.

Effects of the Invention

The present invention can provide the method for manufacturing the near-infrared reflective film and the near-infrared reflective body provided with the same which has excellent manufacturing cost performance, is capable of being employed over a large area, has excellent coating stability, excellent resistance to refractive index irregularity in plane of layers and has high film uniformity.

PREFERRED EMBODIMENT OF THE INVENTION

An optimal embodiment to practice the present invention will now be detailed.

In view of the foregoing, the inventors of the present invention conducted diligent investigations. As a result, discovered was the following method for manufacturing a near-infrared reflective film comprising a high refractive index layer and a low refractive index layer alternately laminated on a support, wherein the difference in the refractive index of the adjacent high refractive index layer and the low refractive index layer is at least 0.3, and the near-infrared reflective film is formed by using a high refractive index layer coating liquid and a low refractive index layer coating liquid, wherein a viscosity ratio ($\eta_{15}/\eta_{45}$) in each of the high refractive index layer coating liquid and the low refractive index layer coating liquid is at least 2.0, provided that a viscosity of the high refractive index layer and the low refractive index layer at 15° C. is represented by $\eta_{15}$ and a viscosity at 45° C. is represented by $\eta_{45}$. Thus, a method for manufacturing a near-infrared reflective film and a near-infrared reflective body provided with the same which has excellent manufacturing cost performance, is capable of being employed over a large area, has excellent coating stability, excellent resistance to refractive index irregularity in plane of layers and has high film uniformity was achieved.

In the film formation using the coating liquid used for forming refractive index layers, especially in the coating liquid containing metal oxide fine particles, since metal oxide fine particles in the formed layer strongly tend to be aggregated, a phase separation occurs in microscopic space. In the stage of the coating liquid for forming refractive index layer containing metal oxide particles in a process of forming the refractive index layer, that is, during steps from stirring in the coating liquid preparation process, sending by piping, forming beads by extrusion from coater, to coating on the support, shear force was always given to the coating liquid for forming the refractive index layer. Therefore, metal oxide particles are kept in stably dispersed state. However, since the shear force is not given in the wet coated layer on the support after being coated, the aggregation of metal oxide particles occurs in drying process with accompanying the phase separation in the case of drying in the state as it is. As a result, in the formed refractive index layer, it occurred the fluctuation of the refractive index which depended on existence state and content of metal oxide particles.

As a method of controlling the phase separation by aggregation of the metal oxide particles in the coated layer on the wet state formed on the above support and the refractive index unevenness within the layer due to it, it is effective to set the viscosity of the coating liquid for forming refractive index layer high, and to control a flow of the metal oxide particles in the coated layer in the wet state. However, by merely raising the viscosity of the coating liquid for forming the refractive index layer, when the coating liquid is coated via the coater onto the support, bead becomes unstable and causes unevenness of the coated layer, thereby it is difficult to form a layer having uniform refractive index. Therefore, as a rheological properties of the coating liquids for the refractive index layers, it is preferable that the coating liquid has relatively low viscosity during steps of from preparing the coating liquid, sending by piping to the coating from coater on the support, and then becomes to have high viscosity in the layer in a wet state after being coated on the support. In other words, in order to form uniform refractive index layers stably, it is important that during steps from preparing to coating the viscosity of the coating liquid becomes low by being warmed at constant temperature. Then after being coated on the support, the coated layer in a wet state is forced to be cooled set and the viscosity of the coating liquid becomes high under such low temperature condition. In view of the foregoing, the inventors of the present invention found that the object and the effect of the present invention can be achieved by applying the coating liquid for forming the refractive index layer having the viscosity ratio ($\eta_{15}/\eta_{45}$) at least 2.0, provided that a viscosity at 15° C. is represented by $\eta_{15}$ and a viscosity at 45° C. is represented by $\eta_{45}$.

As a result of above diligent investigations relating to the method for applying temperature-sensitive properties for the coating liquid for forming the refractive index layer, it was found that a method of utilizing a hydrogen bond is important. For example, the hydrogen bond between polyvinyl alcohol, boric acid or borax and inorganic particle having OH group on it surface, or the hydrogen bond resulting from polysaccharide thickener, the hydrogen bond (sol gel change) by gelatin are found to be effective.

The constituent of the near-infrared reflective film and embodiments of the present invention will now be detailed.

<<Near-Infrared Reflective Film>>

The near-infrared reflective film of the present invention is characterized by having the multilayer laminated body which is formed by laminating the high refractive index layer and the low refractive index layer on the support which differs in a refractive index mutually. It is preferable to have a region which has a transmittance of the visible light of 50% or more based on JIS R3106-1998 and a reflectance of 50% or more at a wavelength of 900 nm-1,400 nm.

In the viewpoint of achieving high infrared reflectance with the small number of layers, it is preferable that the difference of the refractive index between the high refractive index layer and the low refractive index layer is large. In the present invention, it is characterized by that the refractive index difference between adjacent high refractive index layer and low refractive index layer is 0.3 or more, preferably 0.4 or more, and still more preferably 0.45 or more.

The reflectance of a specific wavelength region is determined by the difference of the refractive indexes between adjacent two refractive index layers and the number of laminations. When the larger is the difference between the refractive indexes, the same reflectance can be obtained with the smaller number of layers. The difference of refractive indexes and the required number of layers can be calculated by using the optical design software available on the market. For example, in order to obtain an infrared reflectance of 90% or more, when the difference of refractive indexes is smaller than 0.3, it requires laminating 20 or more layers. Thereby it will cause not only lowering productivity but also increasing scattering at a lamination interface, lowering transparency and it is hardly to manufacture trouble-free. There is not an upper limit to the difference of the refractive indexes in view of improving the reflectance and decreasing the number of layers, but it is a limit substantially about 1.40.

Subsequently, the fundamental composition of the high refractive index layer and the low refractive index layer in the near-infrared reflective film of the present invention will be explained.

In the near-infrared reflective film of the present invention, it is not particularly limited to the number of layers of the high refractive index layer and the low refractive index layer, but from the above-mentioned viewpoint it is preferably 100 or less layers, more preferably 40 or less layers, and still more preferably 20 or less layers.

Further, the near-infrared reflective film of the present invention is characterized in having the difference of the adjacent high refractive index layer and low refractive index layer being 0.3 or more. When there is a plurality of the high refractive index layers and the low refractive index layers respectively as mentioned above, it is preferable that all the refractive index layers satisfy the requirements specified by the present invention. However, the outermost surface layer may be the composition out of the requirements specified by the present invention.

Moreover, in the near-infrared reflective film of the present invention, the refractive index of the high refractive index layer is preferably 1.80-2.50 and more preferably 1.90-2.20. Moreover, the refractive index of the low refractive index layer is preferably 1.10-1.60, and more preferably 1.30-1.50.

Moreover, in the near-infrared reflective film of the present invention, it is preferable to add a metal oxide at least in the high refractive index layer, and more preferably in both the layers of the high refractive index layer and the low refractive index layer. Moreover, polysaccharide thickener is preferably added to at least one of the high refractive index layer and the low refractive index layer, and more preferably in both layers of the high refractive index layer and the low refractive index layer.

In the present invention, the refractive index of the high refractive index layer and the low refractive index layer can be determined according to the following method.

Each refractive index layer sample is prepared as the single layer on the support of which each refractive index would be measured. These samples are cut out to 10 cm×10 cm, followed by determine the refractive index layer according to the following method. The back side of measured side of each sample is processed to roughen, followed by performing optical absorption processing with back spray to prevent the light reflection from the back side. U-4000 type (produced by Hitachi, Ltd.) is used as a spectrophotometer. Reflectance in visible light (400 nm-700 nm) are measured at 25 points under 5° mirror reflection, and an average is calculated to determine an average refractive index from the measured results.

[Support]

With respect to a support applied to the near-infrared reflective film of the present invention, it is preferable a film support. The film support may be transparent or opaque and various resin films can be applicable. Polyolefin films (such as polyethylene or polypropylene), polyester films (such as polyethylene terephthalate or polyethylene naphthalate), polyvinyl chloride, and cellulose triacetate can be used. Of these, and polyester film is preferable. Polyester film (hereinafter referred to as polyester) is not specifically limited, but it is preferably polyester which comprises of dicarboxylic acid component and diol component as main composition components and can form a film. Specific examples of dicarboxylic acid components as main composition components include: terephthalic acid, isophthalic acid, phthalic acid, 2,6-naphthalene dicarboxylic acid, 2,7-naphthalene dicarboxylic acid, diphenyl sulfone dicarboxylic acid, diphenyl ether dicarboxylic acid, diphenyl ethane dicarboxylic acid, cyclohexane dicarboxylic acid, diphenyl dicarboxylic acid, diphenyl thioether dicarboxylic acid, diphenyl ketone dicarboxylic acid, and phenyl indane dicarboxylic acid. Specific examples of diol components include: ethylene glycol, propylene glycol, tetramethylene glycol, cyclohexane dimethanol, 2,2-bis(4-hydroxyphenyl)propane, 2,2-bis(4-hydroxyl ethoxy phenyl) propane, bis(4-hydroxy phenyl) sulfone, bisphenol fluorene dihydroxy ethyl ether, diethylene glycol, neopentyl glycol, hydroquinone, and cyclohexanediol. Of these polyester which use above as main composition components, in view of transparency, mechanical strength and dimensional stability, it is preferably polyester which comprises terephtalic acid or 2,6-naphthalene dicarboxylic acid as dicarboxylic acid component and ethylene glycol or 1,4-cyclohexane dimethanol as diol component. Of these, preferred are polyesters comprising polyethylene terephthalate or polyethylenenaphthalate as main composition components, or a copolymerized polyester consisting of terephthalic acid, 2,6-naphthalene dicarboxylic acid and ethylene glycol, and mixture of two or more kinds of these polyesters as main composition component.

The thickness of the film support according to the present invention is preferably 50-300 μm, specifically preferably 80-250 μm. Further, the film support of the present invention may be a laminated film of two or more films. In this case, the kinds of films may be the same or differ.

[Metal Oxide]

In the near-infrared reflective film of the present invention, it is preferable that at least one layer of a high refractive index layer and a low refractive index layer contains a metal oxide.

Specific examples of metal oxides according to the present invention include: titanium dioxide, zirconium oxide, zinc oxide, synthetic amorphous silica, colloidal silica, alumina, colloidal alumina, lead titanate, minium, chrome yellow, zinc chrome, chromic oxide, ferric oxide, iron black, copper oxide, magnesium oxide, magnesium hydroxide, strontium titanate, yttrium oxide, niobium oxide, europium oxide, lanthanum oxide, zircon, and tin oxide.

The content of metal oxide is not less than 50% by mass and not more than 95% by mass for each layer, more preferable not less than 60% by mass and not more than 90% by mass. In the case of the content of the metal oxide being not less than 50% by mass, it becomes easy to enlarge the difference of refractive index between the high refractive index layer and the low refractive index layer. In the case of the content of the metal oxide being not more than 95% by mass, it becomes easy to have flexible film and easy to form the near-infrared reflective film.

The average particle diameter of the metal oxide according to the present invention can be determined by observing the particles itself or the particles which appeared in the section and the surface of the refractive index layer with an electron microscope, measuring the particle size of 1,000 arbitrary particles, as the simple arithmetic average value (number average). Herein, the particle diameter of each particle is represented by a diameter of the assumed circle equal to its projected area.

As a metal oxide used in the high refractive index layer of the present invention, it is preferable $TiO_2$, $ZnO$, and $ZrO_2$ and more preferable $TiO_2$ (titanium dioxide sol) in the view of the stability of the below-mentioned composite for forming a high refractive index layer containing the metal oxide particles. Moreover, it is preferable a rutile type in $TiO_2$ since it has especially low catalytic activity, the weather resistance of the high refractive index layer or the adjacent layer becomes high, and also has still higher refractive index.

As methods for preparing a titanium dioxide sol which can be used to the present invention, JP-A No. 63-17221, JP-A No. 7-819, JP-A No. 9-165218 and JP-A No. 11-43327, for example, can be referred.

Moreover, as the methods for preparing other titanium dioxide sol, JP-A No. 63-17221, JP-A No. 7-819, JP-A No. 9-165218 and JP-A No. 11-43327, for example, can be referred.

The preferable diameter of a primary particle of titanium dioxide particles is 5 nm-15 nm, and more preferably 6 nm-10 nm.

As a metal oxide in the low refractive index layer according to the present invention, it is preferable to use silicon dioxide as the metal oxide and more preferable acid colloidal silica sol.

As for the metal oxide according to the present invention, the average particle diameter is preferably 100 nm or less. The average particle diameter of the primary particle of the metal oxide dispersed to the state of the primary particle (particle size in a dispersion liquid state before coating) is preferably 20 nm or less, and more preferably 10 nm or less. Moreover, the average particle diameter of the secondary particles is preferably 30 nm or less, in view of exhibiting low haze and excellent visible light transmittance.

[Water Soluble Polymer]

In the refractive index layer according to the present invention, water soluble polymers, such as polyvinyl alcohol, can be used as a binder.

The water soluble polymer according to the present invention is defined as a polymer in which, when a water soluble polymer is prepared as an aqueous solution of 0.5% by mass at the temperature where the polymer dissolves most, and is filtered with G2 glass filter (the maximum pore size of 40-80 μm), the mass of the insoluble material by aeration is 50% by mass or less based on the added water soluble polymer.

Moreover, as a weight average molecular weight of a water soluble polymer, it is preferable not less than 1,000 and not more than 200,000, more preferable not less than 3,000 and not more than 40,000.

Synthetic polymer is listed as a water soluble polymer applicable to the present invention. Specific examples of the water soluble polymers include: polyvinyl alcohols, polyvinyl pyrrolidones, acryl based resins such as polyacrylic acid, acrylic acid-acrylonitrile copolymer, potassium acrylate-acrylonitrile copolymer, vinyl acetate-acrylic ester copolymer, or acrylic acid-acrylic ester copolymer; styrene-acrylic acid ester resins such as styrene-acrylic acid copolymer, styrene-methacrylic acid copolymer, styrene-methacrylic acid-acrylic acid ester copolymer, styrene-α-methyl styrene-acrylic acid ester copolymer or styrene-α-methyl styrene-acrylic acid-acrylic acid ester copolymer; styrene-sodium styrenesulfonate copolymer, styrene-2-hydroxyethyl acrylate copolymer, styrene-2-hydroxyethyl acrylate-potassium styrene sulfonate copolymer, styrene-maleic acid copolymer, styrene-maleic anhydride copolymer, vinyl naphthalene-acrylic acid copolymer, vinyl naphthalene-maleic acid copolymer; and vinyl acetate based copolymers and salts thereof such as vinyl acetate-maleate copolymer, vinyl acetate-crotonic acid copolymer, and vinyl acetate-acrylic acid copolymer. Of these, polyvinyl alcohol, polyvinyl pyrrolidones and copolymer containing thereof is especially preferable.

Polyvinyl alcohols preferably used in the present invention include modified polyvinyl alcohols, such as a cation modified polyvinyl alcohol in which the end is cation modified or an anion modified polyvinyl alcohol which has anionic group, other than the usual polyvinyl alcohol obtained by hydrolyzing polyvinyl acetate.

As the polyvinyl alcohol obtained by hydrolyzing vinyl acetate, preferably used is one having an average polymerization degree of 1,000 or more and especially preferably used is one having 1,500-5,000. Moreover, as the degree of saponification, it is preferable 70 to 100% and especially preferable 80 to 99.5%.

The cation modified polyvinyl alcohol is a polyvinyl alcohol which has primary to tertiary amino group or quarterly ammonium group in the main or side chain of the above-mentioned polyvinyl alcohol, for example disclosed in JP-A No. 61-10483. It is obtained by saponifying the copolymer of the ethylenically unsaturated monomer and vinyl acetate which have a cationic group.

Specific examples of ethylenically unsaturated monomer having cationic group include: trimethyl-(2-acrylamide-2,2-dimethylethyl) ammonium chloride, trimethyl-(3-acrylamide-3,3-dimethylpropyl) ammonium chloride, N-vinylimidazole, N-vinyl-2-methylimidazole, N-(3-dimethylamino propyl) methacylamide, hydroxylethyl trimethyl ammonium chloride, trimethyl-(2-methacryamide propyl) ammonium chloride, and N-(1,1-dimethyl-3-dimethylamino propyl) acrylamide. The ratio of the monomer containing the cation modifying group in the cation modified polyvinyl alcohol is 0.1-10 mol %, preferably 0.2-5 mol % based on the vinyl acetate.

Specific examples of the anion modified polyvinyl alcohols include: polyvinyl alcohol having anionic group described in JP-A No. 1-206088, copolymer of vinyl alcohol and vinyl compound having water soluble group described in JP-A No. 61-237681 and JP-A No. 63-307979 and modified polyvinyl alcohol having water soluble group described in JP-A No. 7-285265.

Moreover, specific examples of nonion modified polyvinyl alcohols include: polyvinyl alcohol derivative in which poly alkylene oxide group is added to a part of vinyl alcohol described in JP-A No. 7-9758, and block copolymer of the vinyl compound having hydrophobic group and vinyl alcohol described in JP-A No. 8-25795. Two or more species of polyvinyl alcohol which has different degree of polymerization or different kinds can also be used in combination.

[Inorganic Polymer]

In each refractive index layer according to the present invention, inorganic polymers such as a compound containing zirconium atom or a compound containing aluminum atom can be used.

The compounds containing zirconium atom applicable to the present invention exclude zirconium oxide. Specific examples include: zirconium difluoride, zirconium trifluoride, zirconium tetrafluoride, hexafluoro zirconate (for example, potassium salt), heptafluoro zirconate (for example, sodium salt, potassium salt or ammonium salt), octafluoro zirconate (for example, lithium salt), zirconium oxide fluoride, zirconium dichloride, zirconium trichloride, zirconium tetrachloride, hexachloro zirconate (for example, sodium salt or potassium salt), acid zirconium chloride (zirconyl chloride), zirconium dibromide, zirconium tribromide, zirconium tetrabromide, zirconium oxide bromide, zirconium triiodide, zirconium tetraiodide, zirconium peroxide, zirconium hydroxide, zirconium sulfide, zirconium sulfate, zirconium p-toluenesulfonate, zirconyl sulfate, sodium zirconyl sulfate, acid zirconyl sulfate trihydrate, potassium zirconyl sulfate, zirconium selenate, zirconium nitrate, zirconyl nitrate, zirconium phosphate, zirconyl carbonate, ammonium zirconyl carbonate, zirconium acetate, zirconyl acetate, ammonium zirconyl acetate, zirconyl lactate, zirconyl citrate, zirconyl stearate, zirconyl phosphorate, zirconium oxalate, zirconium isopropylate, zirconium butylate, zirconium acetylacetonate, acetylacetone zirconium butylate, zirconium stearate butylate, zirconium acetate, bis(acetylacetonato)dichlorozirconium, and tris(acetylacetonato)chlorozirconium.

Of these, zirconyl carbonate, zirconyl ammonium carbonate, zirconyl acetate, zirconyl nitrate, acid zirconyl chloride, zirconyl lactate, and zirconyl citrate are preferable, and zirconyl ammonium carbonate, acid zirconyl chloride and zirconyl acetate are preferable especially. As specific brand names of the above-mentioned compounds, listed are: zirconyl acetate ZA (brand name) produced by DAIICHI KIGENSO KAGAKU KOGYO CO., LTD. and acid zirconyl chloride (brand name) produced by DAIICHI KIGENSO KAGAKU KOGYO CO., LTD.

The compound containing zirconium atom may be employed individually or in combinations of at least two different types.

Moreover, the compounds containing aluminum atom applicable to the present invention exclude aluminum oxide. Specific examples include: aluminum fluoride, hexafluoro aluminate (for example, potassium salt), aluminum chloride, basic aluminum chloride (for example, poly aluminum chloride), tetrachloro aluminate (for example, sodium salt), aluminum bromide, tetrabromo aluminate (for example, potassium salt), aluminum iodide, aluminate (for example, sodium salt, potassium salt, a calcium salt), aluminum chlorate, aluminum perchlorate, aluminum thiocyanate, aluminum sulfate, basic aluminum sulfate, potassium aluminum sulfate (alum), aluminum ammonium sulfate (ammonium alum), sodium aluminum sulfate, aluminum phosphate, aluminum nitrate, aluminum hydrogen phosphate, aluminum carbonate, poly aluminum sulfate silicate, aluminum formate, aluminum acetate, aluminum lactate, aluminum, oxalate, aluminum isopropylate, aluminum butylate, ethyl acetate aluminum diisopropylate, aluminum tris(acetylacetonate), aluminum tris (ethylacetoacetate), and aluminum monoacetyl acetonate bis (ethylacetoacetonate).

Of these, aluminum chloride, basic aluminum chloride, aluminum sulfate, basic aluminum sulfate, and basic aluminum sulfate silicate are preferable, and basic aluminum chloride and basic aluminum sulfate are the most preferable.

[Curing Agent]

In the present invention, in order to cure the water soluble polymer as a binder, it is preferable to use a curing agent.

As a curing agent applicable to the present invention, there will be no limitation in particular so long as it can react with a water soluble polymer, but boric acid and its salt are preferable. Other well-known compounds can be used which generally has a group which can react with a water soluble polymer, or which promotes the reaction of different groups in the water soluble polymer, and is selected and used suitably according to the kind of the water soluble polymer. Specific examples of curing agents include: epoxy based curing agent (such as diglycidyl ethylether, ethylene glycol diglycidyl ether, 1,4-butanediol diglycidyl ether, 1,6-diglycidyl cyclohexane, N,N-glycidyl-4-glycidyoxy aniline, sorbitol polyglycidyl ether, and glycerol polyglycidyl ether), aldehyde based curing agents (such as formaldehyde, and glyoxal), active halogen based curing agents (such as 2,4-dichloro-4-hydroxy-1,3,5-s-triazine), active vinyl based compounds (such as 1,3,5-trisacryloyl-hexahydro-s-triazine and bisvinyl sulfonyl methyl ether), and aluminum alum.

Boric acid or its salt means the oxygen acid which uses a boron atom as a central atom, and salt thereof. Specifically listed are: orthoboric acid, diboric acid, metaboric acid, tetraboric acid, pentaboric acid, octaboric acid, and salts thereof.

As a curing agent, the boric acid having boron atom and salt thereof may be employed individually as aqueous solution or in combinations of at least two types. Especially it is preferable to use a mixed aqueous solution of boric acid and borax.

The aqueous solution of boric acid and borax each can be added only by comparatively dilute aqueous solution, but a concentrated aqueous solution can be made by mixing both of them and the coating liquid can be concentrated. Moreover, it has advantage of controlling pH of the added aqueous solution relatively freely.

As for the total used amount of the above-mentioned curing agent, it is preferable 1-600 mg per 1 g of above-mentioned water soluble polymer and still more preferable 100-600 mg.

[Gelatin]

In each refractive index layer according to the present invention, it is preferable to contain gelatin.

As for gelatin, besides lime processing gelatin, acid treatment gelatin may be used in combination, and further a gelatin hydrolysate and an enzymatic decomposed gelatin can also be used. These water swellable polymers may be employed individually or in combinations of at least two types.

[Amino Acid]

In the present invention, it is preferable to add an amino acid for the purpose of improving the dispersibility of metal oxide.

Herein amino acid of the present invention refers to as a compound which has an amino group and a carboxyl group in the same molecule. Any type of amino acid such as $\alpha$-, $\beta$-, $\gamma$-type may be applicable, but it is preferable to have an isoelectric point of 6.5 or less. Although an optical isomer exists in some amino acid, in the present invention there is no difference of the effect by optical isomers, and any isomer having isoelectric point of 6.5 or less can be used independently or in a racemic form.

The detailed description about an amino acid applicable to the present invention can be referred to Kagaku Daijiten 1, reduced edition (Kyoritsu shuppan; issued in Showa 35), pages 268-270.

In the present invention, as preferable amino acids, listed are: glycine, alanine, valine, $\alpha$-aminobutyric acid, $\gamma$-aminobutyric acid, $\beta$-alanine, serine, $\epsilon$-amino-n-caproic acid, leucine, norleucine, phenylalanine, threonine, asparagine, aspartic acid, histidine, lysine, glutamine, cysteine, methionine, proline, and hydroxyproline. For using as an aqueous solution, it is preferable to have the solubility of 3 g or more based on 100 of water at the isoelectric point. For example, glycine, alanine, serine, histidine, lysine, glutamine, cysteine, methionine, proline, and hydroxyproline are used preferably. From a viewpoint that metal oxide particles have a loose hydrogen bond with a binder, more preferably used are serine and hydroxyproline which has hydroxyl group.

[Polysaccharide Thickener]

In each refractive index layer according to the present invention, it is preferable to contain polysaccharide thickener.

As polysaccharide thickeners which can be used by the present invention for example, listed are: generally known natural simple polysaccharides, natural complex polysaccharides, synthetic simple polysaccharides, and synthetic complex polysaccharides. The details of these polysaccharides can be referred to "Seikagaku Jiten (2nd edition), published by Tokyo Kagaku Dojin" and "Shokuhin Kogyo" volume 31 (1988), page 21.

The polysaccharide thickener used in the present invention is a polymer of saccharides and has many hydrogen bond groups in a molecule, which has characteristic in large difference between viscosities at low temperature and at high temperature due to changing hydrogen bonding strength between molecules with temperature. When metal oxide particles are further added, it causes a viscosity rise which is considered to be caused on hydrogen bond with the metal oxide particles at low temperature. The range of the viscosity increase by adding the polysaccharide is 1.0 or more mPa·s at 40° C., preferably 5.0 or more mPa·s, and still more preferably 10.0 or more mPa·s.

Specific examples of polysaccharide thickeners applicable to the present invention include: $\beta$-1,4-glucan (for example, such as carboxymethyl cellulose and carboxy ethylcellulose), galactans (for example, such as agarose and agaropectin), galacto manno glycan (for example, such as locust bean gum and guaran), and xyloglucan (for example, such as tamarind gum), gluco mammo glycans (for example, such as arum mannan, wood origin gluco mannan and xanthan gum), galacto gluco manno glycans (for example, such as needle-leaf tree origin glycan), arabino galacto glycan (for example, such as soybean origin glycan and microbe origin glycan), gluco rhamno glycans (for example, such as gellan gum), glycosamino glycans (for example, such as hyaluronic acid and keratan sulfate), alginic acid and alginate, agar, and natural polymer polysaccharides originating in red algae such as κ-carragheenan, λ-carragheenan, ι-carragheenan and furcelleran. From viewpoint in which the dispersion stability of the metal oxide particles together in the coating liquid is not reduced, it is preferable that the constitutional unit has neither a carboxylic acid group nor a sulfonic acid group. As such polysaccharides, for example, preferred is a polysaccharide which consists only of pentose such as L-arabitose, D-ribose, 2-deoxyribose and D-xylose; and hexose such as D-glucose, D-fructose, D-mannose and D-galactose. Specifically preferably used are: tamarind seed gum known as xyloglucan whose main chain is glucose and side chain is also glucose; guar gum, locust bean gum and guaran known as galacto mannan whose main chain is mannose and side chain is glucose; and arabino galactan whose main chain is gactose and side chain is arabinose.

In the present invention, it is still more preferable to use two or more kinds of polysaccharide thickeners in combination.

As a content of polysaccharide thickener contained in each refractive index layer, it is preferably not less than 5% by mass and not more than 50% by mass, more preferably not less than 10% by mass and not more than 40% by mass. However, when it is used in combination with water soluble polymer or emulsion resin, the content may be not less than 3% by mass. In the case of being little polysaccharide thickener, the layer surface tends to be coarse during drying and to deteriorate transparency largely. On the other hand, in the case of the content being not more than 50% by mass, the relative content of the metal oxide will become suitable and it will become easy to enlarge the refractive index difference between the high refractive index layer and the low refractive index layer.

[Other Additives in Refractive Index Layer]

Various kinds of additives can be appropriately added to the high refractive index layer and the low refractive index layer according to the present invention.

Various well-known additives can be contained, for example, such ultraviolet absorption agents described in JP-A No. 57-74193, JP-A No. 57-87988, and JP-A No. 62-261476; fading inhibitors described in JP-A No. 57-74192, JP-A No. 57-87989, JP-A No. 60-72785, JP-A No. 61-146591, JP-A No. 1-95091 and JP-A No. 3-13376; various surface active agents such as anionic, cationic or nonionic surface active agents, optical whitening agents described in JP-A No. 59-42993, JP-A No. 59-52689, JP-A No. 62-280069, JP-A No. 61-242871, and JP-A No. 4-219266; pH adjusters such as sulfuric acid, phosphoric acid, acetic acid, citric acid, sodium hydroxide, potassium hydroxide, and potassium carbonate; defoaming agents, lubricants such as diethylene glycol, antiseptic agents, antistatic agents, and mat agents.

[Production Method of Near-infrared Reflective Film]

The high refractive index layer and the low refractive index layer are coated by turns on the support and dried to form the near-infrared reflective film of the present invention as the laminated body.

As coating methods, for example preferably used are: a roll coating method, a rod bar coating method, an air knife coating method, a spray coating method, a curtain coating method, or a slide bead coating method and an extrusion coating method which use a hopper described in U.S. Pat. Nos. 2,761,419 and 2,761,791.

In the present invention, the high refractive index layer and low refractive index layer according to the present invention is characterized by being formed by using a high refractive index layer coating liquid and a low refractive index layer coating liquid, wherein a viscosity ratio ($\eta_{15}/\eta_{45}$) is preferably not less than 2.0 and not more than 5,000, more preferably not less than 50 and not more than 5,000, still more preferably not less than 100 and not more than 5,000, provided that a viscosity of the high refractive index layer and the low refractive index layer at 15° C. is represented by $\eta_{15}$ and a viscosity at 45° C. is represented by $\eta_{45}$. In the present invention, the higher viscosity ratio ($\eta_{15}/\eta_{45}$) is preferable in both of the high refractive index layer coating liquid and the low refractive index layer coating liquid.

For example, with respect to the viscosity of the high refractive index layer coating liquid and the low refractive index layer coating liquid for a simultaneous multilayer coating, in the case of using a slide bead coating method, it is preferably in the range of 5-100 mPa·s as viscosity of the coating liquid at 45° C., still more preferably in the range of 10-50 mPa·s. Moreover, in the case of using a curtain coating method, it is preferably in the range of 5-1,200 mPa·s, still more preferably in the range of 25-500 mPa·s.

Moreover, as viscosity of the coating liquid at 15° C., it is preferably not less than 5 mPa·s and not more than 5,000 mPa·s, more preferably not less than 50 mPa·s and not more than 2,000 mPa·s, and still more preferably not less than 100 mPa·s and not more than 500 mPa·s.

In the present invention, as a method of controlling the viscosity and the viscosity ratio ($\eta_{15}/\eta_{45}$) of the high refractive index layer coating liquid and the low refractive index layer coating liquid in the desired range, it is preferable to use methods of changing the kind (molecular weight) of water soluble polymer, the addition amount, or the solid content ratio.

Moreover, as methods of measuring the viscosity of the high refractive index layer coating liquid and the low refractive index layer coating liquid, listed are viscometers by rotating type, oscillating type, and capillary type. For example, commercially available are: Cone plate type E type Viscometer produced by TOKIMEC, E Type Viscometer (rotating viscometer) produced by TOKI SANGYO CO., LTD., B type Viscometer BL produced by TOKYO KEIKI INC., FVM-80A produced by Yamaichi Electronics Co., Ltd., Viscoliner produced by Nametore Industry Corporation and VISCO MATE MODEL VM-1A and MODEL DD-1 produced by Yamaichi Electronics Co., Ltd. The values measured with B type viscometer BL produced by TOKYO KEIKI INC. were used for the viscosity of the high refractive index layer coating liquid and low refractive index layer coating liquid in the present invention.

As the coating and drying method, it is preferable that the high refractive index layer coating liquid and the low refractive index layer coating liquid are warmed at 30° C. or more and coated, followed by once cooling the coated layer to the temperature of 1-15° C., and then drying above 10° C. More preferably, the drying process is carrying out under the condition in the range of the wet-bulb temperature of 5-50° C., and the layer surface temperature of 10-50° C. Moreover, as the cooling process immediately after coating, it is preferable to carry out by a horizontal set process in view of the uniformity of the formed layer.

[Application of Near-infrared Reflective Film]

The near-infrared reflective film of the present invention is applicable to broad fields. For example, it is adhered to the equipment exposed by sunlight for a long period such as an outdoor window of the building or the car window. It is used as a film for windowpane such as a heat ray reflective film which gives the heat ray reflective effect or a film for vinyl houses for agriculture mainly for enhancing weather resistance.

It is especially suitable for the component in which the near-infrared reflective film of the present invention is adhered to the glass or the resin material alternative to the glass directly or via adhesives.

When it is adhered to a windowpane, adhesives are used so that the near-infrared reflective film is in the incidence plane side of sunlight (heat ray). Moreover, it is preferable in view of durability to sandwich a near-infrared reflective film between a windowpane and a base material, since it can be sealed from circumference gas such as moisture. The near-infrared reflective film of the present invention can be preferably installed in the outdoors or the outside of car (as outdoor use) because it has environmental durability.

As adhesives applicable to the present invention, the adhesives can be used which has a photo curable or heat curable resin as a principal component.

As for adhesives, it is preferable to have resistance to ultraviolet radiation, such as acryl based adhesives or silicone based adhesives. Furthermore, in view of adhesion characteristics or cost, it is preferable acrylic based adhesives. Since it is especially easy to control a peeling strength, a solvent based abrasive is preferable among a solvent based and an emulsion based acryl based adhesives. In the case of using solution polymerization polymer as acryl solvent based adhesive, well-known monomers can be used.

Moreover, polyvinyl butyral based resin used as the intermediate layer in the laminated glass, or ethylene vinyl acetate copolymer based resin can be used Specifically, listed are: plastic polyvinyl butyral (produced by Sekisui Chemical Co., Ltd. or Mitsubishi Monsanto Co.), ethylene-vinyl acetate copolymer (produced by E. I. du Pont de Nemours & Co., Takeda Pharmaceutical Company, Ltd., Duramine), and modified ethylene vinyl acetate copolymer (produced by TOSOH CORP., Melthene G). In addition, ultraviolet absorption agent, anti-oxidizer, antistatic agent, heat stabilizer, lubricant, filler, colorant, and adhesion adjustment agent may be added suitably to the adhesive layer.

EXAMPLES

Hereafter, although concrete examples of the present invention are described, the present invention is not limited to these examples. Incidentally, the expression of "part" or "%" referred to in Examples represents "part by mass" or "% by mass" unless otherwise specified.

Example 1

<<Production of Near-infrared Reflective Film>>
[Preparation of Rutile Type Titanium Dioxide Sol]

Into 10 L (liter) of a water suspension (concentration of $TiO_2$:100 g/L) in which a titanium dioxide hydrate was suspend in water, 30 L of a sodium hydroxide aqueous solution (concentration of 10 mol/L) was added with stirring, then rising temperature to 90° C. and ripening for 5 hours, followed by being neutralized with hydrochloric acid, filtered and washed. Here in the above-mentioned reaction (processing), used was the titanium dioxide hydrate which was obtained by the heat hydrolysis of the sulfuric acid titanium aqueous solution according to the well-known technique.

A base treated titanium compound was suspended in pure water so that it may become 20 g/L by $TiO_2$ concentration, and 0.4 mol % of citric acid based on $TiO_2$ was added with stirring and raising a temperature. When the liquid temperature reached to 95° C., a concentrated hydrochloric acid was gradually added so that concentration may become 30 g/L and agitated for 3 hours, while maintaining the liquid temperature.

pH and zeta potential of the obtained titanium oxide sol liquid were measured. pH was 1.4 and zeta potential was +40 mV. Furthermore, particle size was measured by Malvern Zetasizer Nano. Average particle diameter was 5 nm and the degree of monodisperse was 16%. Moreover, titanium oxide sol liquid was dried at 105° C. for 3 hours, resulting in obtaining particle powder and X-ray diffraction thereof was measured by using JDX-3530 produced by the JEOL DATUM, and confirmed they were rutile type titanium oxide particles.

[Production of Sample 1Comparative Example]
(High Refractive Index Layer 1)
<Preparation of Dispersion A>

As a metal oxide particle, 109 parts by mass of rutile type titanium dioxide (produced by Ishihara Sangyo Kaisha, Ltd., TTO-55A, particle size of 30-50 nm, surface treated by aluminum hydroxide, refractive index 2.6), 11 parts by mass of polyethylene imine based block polymer as a dispersant, and 180 parts by mass of poly propylene glycol monomethyl ether acetate (hereafter, referred to as PGMEA, produced by Wako Pure Chemical Industries, Ltd.) were dispersed for 24 minutes by a bead mill disperser with 141 parts by mass of zirconia bead whose average diameter are 0.5 mm. Then followed by further dispersing by the bead mill disperser for 147 minutes by changing to the zirconia bead whose average diameter is 0.1 mm, and Dispersion A was obtained.

<Preparation of Solution A>

A PGMEA solution was prepared and referred to as Solution A which comprises 50% by mass of 4,4'-bis(β-methacryloyl oxyethyl thio)diphenyl sulfone (refractive index of 1.65 after curing) as binder resin and 0.25% by mass of 2,4,6-trimethylbenzoyl diphenylphosphine oxide as a polymerization initiator.

<Preparation of Solution B>

A mixed solution having the mixture ratio 1:7 (mass ratio) of the above-mentioned Dispersion A and Solution A was prepared, and referred to as Solution B.

<Preparation of Coating Liquid 1 for High Refractive Index Layer>

A mixed solution having the mixture ratio 1:1 (mass ratio) of the above-mentioned Dispersion B and PGMEA was prepared, and referred to as Coating liquid 1 for High refractive index layer.

<Formation of High Refractive Index Layer 1>

After dropping 2 ml of the above prepared Coating liquid 1 for high refractive index layer on a slide glass (produced by MATSUNAMI GLASS IND., ITD., 76 mm×52 mm, 13 mm in thickness, haze of 0.4%) and coated by Spin coater 1H-D7 (produced by MIKASA CO., LTD.) by 1,000 rpm for 30 seconds, and heated for 10 minutes at 120° C. Then, ultraviolet radiation was irradiated by using the electrodeless mercury lamp (produced by Fusion UV systems) of output 184 W/cm by an integrated light quantity of 2.8 J/cm², High refractive index layer 1 was obtained. The average refractive index of High refractive index layer 1 was 2.10.

The viscosity ($\eta_{45}$) at 45° C. and the viscosity ($\eta_{15}$) at 15° C. of Coating liquid 1 for the high refractive index layer prepared above were measured by B type viscometer, and $\eta_{15}/\eta_{45}$ was calculated to be 1.80.

(Low Refractive Index Layer A)

The above formed High refractive index layer 1 was surface modified by the corona discharge treatment (Corona discharge surface treatment equipment produced by Sinkodenki co., ltd.). After dropping 2 ml of 1% by mass of polyvinyl alcohol (PVA117, produced by Kuraray Co., Ltd.) on it and it was placed still for 1 minute at the room temperature, then coated by spin coater by 500 rpm for 30 seconds Immediately after coating, it was heated for 10 minutes on hot plate (FWD-3000, produced by AS ONE Corporation) at 80° C. and Low refractive index layer A was laminated on High refractive index layer 1. The average refractive index of Low refractive index layer A was 1.52.

The viscosity ($\eta_{45}$) at 45° C. and the viscosity ($\eta_{15}$) at 15° C. of Coating liquid A for the low refractive index layer prepared above were measured by B type viscometer, and $\eta_{15}/\eta_{45}$ was calculated to be 1.80.

(Formation of Laminated Body)

Further, on Low refractive index layer A, laminated were High refractive index layer 1/Low refractive index layer A/High refractive index layer 1/Low refractive index layer A/High refractive index layer 1/Low refractive index layer A/High refractive index layer 1/Low refractive index layer A in this order. The high refractive index layer and the low refractive index layer were laminated so that each layer thickness after drying may have the thickness listed in Tables 1 and 2, and Sample 1 was produced which is a near-infrared reflective film consisting of 10 layers in total.

Herein, after each layer was coated and dried in a single layer, the following layer was laminated.

[Production of Sample 2Comparative Example]

Sample 2 which consists of 24 layers was produced in the same manner as the production of the above mentioned Sample 1, except for changing to the following Coating liquid 2 for High refractive index layer 2 and forming High refractive index layer 2, instead of Coating liquid 1 for high refractive index layer used for forming High refractive index layer 1.

(Preparation of Coating Liquid 2 for High Refractive Index Layer)

Into 50 parts of water, 4.0 parts of polyvinyl alcohol (PVA203 produced by Kuraray Co., Ltd.) was dissolved, then 5.0 parts of 1.0% by mass of boric acid aqueous solution of which pH was adjusted to 3.0 with nitric acid and 100 parts of zirconia sol (Nano Use ZR30-AR produced by Nissan chemical industry, ltd.) were added followed by measuring up to 250 parts with water and Coating liquid 2 for high refractive index layer was prepared.

The viscosity ($\eta_{45}$) at 45° C. and the viscosity ($\eta_{15}$) at 15° C. of Coating liquid 2 for high refractive index layer prepared above were measured by B type viscometer, and $\eta_{15}/\eta_{45}$ was calculated to be 2.30.

(Formation of High Refractive Index Layer 2)

While keeping warm at 45° C., above prepared Coating liquid 2 for high refractive index layer was coated by using the wire bar on the polyethylene terephthalate film of 50 μm thickness warmed at 45° C. so that dry layer thickness became 143 nm. Consequently cold air was blown for 1 minute so that the layer surface became to 15° C. or less and set. Then warm air at 80° C. was blown to dry and High refractive index layer 2 was formed.

(Formation of Low Refractive Index Layer A)

Consequently while keeping warm at 45° C., above prepared Coating liquid A for low refractive index layer was coated by using the wire bar on the polyethylene terephthalate film on which above mentioned High refractive index layer 2 has been formed so that dry layer thickness became 163 nm. Consequently cold air was blown for 1 minute so that the layer surface became to 15° C. or less and set. Then warm air at 80° C. was blown to dry and Low refractive index layer A was formed.

(Formation of Lamination Body)

Further, on Low refractive index layer A, laminated were High refractive index layer 2/Low refractive index layer A/High refractive index layer 2/Low refractive index layer A/High refractive index layer 2/Low refractive index layer A/High refractive index layer 2/Low refractive index layer A in this order. The high refractive index layer and the low refractive index layer were laminated to total of 24 layers so that each layer thickness after drying may have the thickness listed in Tables 1 and 2, and Sample 2 was produced which is a near-infrared reflective film consisting of 24 layers in total.

[Production of Sample 3Comparative Example]

Sample 3 which consists of 10 layers was produced in the same manner as the production of the above mentioned Sample 1, except for changing to the following Coating liquid 3 for High refractive index layer 3 and forming High refractive index layer 3, instead of Coating liquid 1 for high refractive index layer used for forming High refractive index layer 1.

(Preparation of Coating Liquid 3 for High Refractive Index Layer)

Into 25 parts of water, 4.0 parts of polyvinyl alcohol (PVA203 produced by Kuraray Co., Ltd.) was dissolved, then 5 parts of 1:1 mixture of 1.0% by mass of boric acid aqueous solution and 4.0% by mass of borax aqueous solution was added wherein pH of the mixture was adjusted to 3.0 with nitric acid. Then, 100 parts of zirconia sol (Nano Use ZR30-AR produced by Nissan chemical industry, ltd.) and polyvinyl alcohol solution in which 4.0 parts of polyvinyl alcohol (PVA235 produced by Kuraray Co., Ltd.) was dissolved into 25 parts of water were added followed by measuring up to 250 parts with water and Coating liquid 3 for high refractive index layer was prepared.

The viscosity ($\eta_{45}$) at 45° C. and the viscosity ($\eta_{15}$) at 15° C. of Coating liquid 3 for high refractive index layer prepared above were measured by B type viscometer, and $\eta_{15}/\eta_{45}$ was calculated to be 114.3.

[Production of Sample 4Inventive Example]

Sample 4 which consists of 10 layers was produced in the same manner as the production of the above mentioned Sample 2, except for changing to the following Coating liquid B for Low refractive index layer B and forming Low refractive index layer B, instead of Coating liquid A for low refractive index layer used for forming Low refractive index layer A.

(Preparation of Coating Liquid B for Low Refractive Index Layer)

Into 50 parts of water, 4.0 parts of polyvinyl alcohol (produced by PVA203 Kuraray Co., Ltd.) was dissolved, then 5.0 parts of 1.0% by mass of boric acid aqueous solution of which pH was adjusted to 3.0 with nitric acid and 100 parts of silica sol (Silicadol 20P produced by Nippon Chemical Industrial Co., Ltd.) were added followed by measuring up to 250 parts with water and Coating liquid B for low refractive index layer was prepared.

The viscosity ($\eta_{45}$) at 45° C. and the viscosity ($\eta_{15}$) at 15° C. of Coating liquid B for low refractive index layer prepared above were measured by B type viscometer, and $\eta_{15}/\eta_{45}$ was calculated to be 6.00.

(Formation of Lamination Body)

On the support, laminated were High refractive index layer 2/Low refractive index layer B/High refractive index layer 2/Low refractive index layer B/High refractive index layer 2/Low refractive index layer B/High refractive index layer 2/Low refractive index layer B in this order. The high refractive index layer and the low refractive index layer were laminated to total of 10 layers so that each layer thickness after drying may have the thickness listed in Tables 1 and 2, and Sample 4 was produced which is a near-infrared reflective film consisting of 10 layers in total. Herein, after each layer was coated in a single layer, cold air was blown for 1 minute so that the layer surface became to 15° C. or less and set. Then warm air at 80° C. was blown to dry and the following layer was laminated.

[Production of Sample 5 Inventive Example]

Sample 5 which consists of 10 layers was produced in the same manner as the production of the above mentioned Sample 4, except for changing to the following Coating liquid C for low refractive index layer and forming Low refractive index layer C, instead of Coating liquid B for low refractive index layer used for forming Low refractive index layer B.

(Preparation of Coating Liquid C for Low Refractive Index Layer)

Into 25 parts of water, 4.0 parts of polyvinyl alcohol (produced by PVA203 Kuraray Co., Ltd.) was dissolved, then 5 parts of 1:1 mixture of 1.0% by mass of boric acid aqueous solution and 4.0% by mass of borax aqueous solution was added wherein pH of the mixture was adjusted to 3.0 with nitric acid. Then, 100 parts of silica sol (Silicadol 20P produced by Nippon Chemical Industrial Co., Ltd.) and polyvinyl alcohol solution in which 4.0 parts of polyvinyl alcohol (PVA235 produced by Kuraray Co., Ltd.) was dissolved into 25 parts of water were added followed by measuring up to 250 parts with water and Coating liquid C for low refractive index layer was prepared.

The viscosity ($\eta_{45}$) at 45° C. and the viscosity ($\eta_{15}$) at 15° C. of Coating liquid C for low refractive index layer prepared above were measured by B type viscometer, and $\eta_{15}/\eta_{45}$ was calculated to be 177.8.

[Production of Sample 6 Inventive Example]

Sample 6 was produced by coating 10 layers simultaneously in the same manner as the production of the above mentioned Sample 5, except for changing to the following Coating liquid 3 for high refractive index layer and forming High refractive index layer 3, instead of Coating liquid 2 for high refractive index layer used for forming High refractive index layer 2 and also changing to the following coating method.

(Coating Method)

Simultaneous multilayer coating was carried out by using a slide hopper type coater which can coat simultaneously 10 layers. Coated were Coating liquid 3 for high refractive index layers as the 1st layer, Coating liquid C for low refractive index layers as the 2nd layer, Coating liquid 3 for high refractive index layers and Coating liquid C for low refractive index layers by turns for the 3rd layer to the 10th layer on the 50 µm thick polyethylene terephthalate film with coating liquid temperature at 45° C. Consequently cold air was blown for 1 minute so that the layer surface became to 15° C. or less and set. Then warm air at 80° C. was blown to dry and Sample 6 was produced.

[Production of Sample 7 Inventive Example]

Sample 7 was produced by coating 10 layers simultaneously in the same manner as the production of the above mentioned Sample 6, except for changing to the following Coating liquid 4 for high refractive index layer and forming High refractive index layer 4, instead of Coating liquid 3 for high refractive index layer used for forming High refractive index layer 3.

(Preparation of Coating Liquid 4 for High Refractive Index Layer)

Into 25 parts of water, 4.0 parts of polyvinyl alcohol (produced by PVA203 Kuraray Co., Ltd.) was dissolved, then 5 parts of 1:1 mixture of 1.0% by mass of boric acid aqueous solution and 4.0% by mass of borax aqueous solution was added wherein pH of the mixture was adjusted to 3.0 with nitric acid. Then, 100 parts of rutile type titan oxide particle sol and polyvinyl alcohol solution in which 4.0 parts of polyvinyl alcohol (PVA235 produced by Kuraray Co., Ltd.) was dissolved into 25 parts of water were added followed by measuring up to 250 parts with water and Coating liquid 4 for high refractive index layer was prepared.

The viscosity ($\eta_{45}$) at 45° C. and the viscosity ($\eta_{15}$) at 15° C. of Coating liquid 4 for high refractive index layer prepared above were measured by B type viscometer, and $\eta_{15}/\eta_{45}$ was calculated to be 105.0.

[Production of Sample 8 Inventive Example]

Sample 8 was produced by coating 10 layers simultaneously in the same manner as the production of the above mentioned Sample 7, except for changing to the following Coating liquid 5 for high refractive index layer and forming High refractive index layer 5, instead of Coating liquid 4 for high refractive index layer used for forming High refractive index layer 4.

(Preparation of Coating Liquid 5 for High Refractive Index Layer)

Into 25 parts of water, 3.5 parts of polyvinyl alcohol (produced by PVA203 Kuraray Co., Ltd.) was dissolved, then 5 parts of 1:1 mixture of 1.0% by mass of boric acid aqueous solution and 4.0% by mass of borax aqueous solution was added wherein pH of the mixture was adjusted to 3.0 with nitric acid. Then, 100 parts of above prepared rutile type titan oxide particle sol and polyvinyl alcohol solution in which 4.5 parts of polyvinyl alcohol (PVA235 produced by Kuraray Co., Ltd.) was dissolved into 25 parts of water were added followed by measuring up to 250 parts with water and Coating liquid 5 for high refractive index layer was prepared.

The viscosity ($\eta_{45}$) at 45° C. and the viscosity ($\eta_{15}$) at 15° C. of Coating liquid 5 for high refractive index layer prepared above were measured by B type viscometer, and $\eta_{15}/\eta_{45}$ was calculated to be 120.0.

[Production of Sample 9 Inventive Example]

Sample 9 was produced by coating 10 layers simultaneously in the same manner as the production of the above mentioned Sample 7, except for changing to the following Coating liquid 6 for high refractive index layer and forming High refractive index layer 6, instead of Coating liquid 4 for high refractive index layer used for forming High refractive index layer 4.

(Preparation of Coating Liquid 6 for High Refractive Index Layer)

Coating liquid 6 for high refractive index layer was prepared in the same manner as the preparation of above mentioned Coating liquid 4 for high refractive index layer, except for further adding 10 part of histidine (isoelectric point: 7.6) as amino acid.

The viscosity ($\eta_{45}$) at 45° C. and the viscosity ($\eta_{15}$) at 15° C. of Coating liquid 6 for high refractive index layer prepared above were measured by B type viscometer, and $\eta_{15}/\eta_{45}$ was calculated to be 144.4.

[Production of Sample 10 Inventive Example]

Sample 10 was produced by coating 10 layers simultaneously in the same manner as the production of the above mentioned Sample 7, except for changing to the following Coating liquid 7 for high refractive index layer and forming High refractive index layer 7, instead of Coating liquid 4 for high refractive index layer used for forming High refractive index layer 4.

(Preparation of Coating Liquid 7 for High Refractive Index Layer)

Coating liquid 7 for high refractive index layer was prepared in the same manner as the preparation of above mentioned Coating liquid 4 for high refractive index layer, except for further adding 10 part of lysine (isoelectric point: 9.8) as amino acid.

The viscosity ($\eta_{45}$) at 45° C. and the viscosity ($\eta_{15}$) at 15° C. of Coating liquid 7 for high refractive index layer prepared above were measured by B type viscometer, and $\eta_{15}/\eta_{45}$ was calculated to be 177.8.

[Production of Sample 11Inventive Example]

Sample 11 was produced by coating 10 layers simultaneously in the same manner as the production of the above mentioned Sample 7, except for changing to the following Coating liquid 8 for high refractive index layer and forming High refractive index layer 8, instead of Coating liquid 4 for high refractive index layer used for forming High refractive index layer 4.

(Preparation of Coating Liquid 8 for High Refractive Index Layer)

Coating liquid 8 for high refractive index layer was prepared in the same manner as the preparation of above mentioned Coating liquid 4 for high refractive index layer, except for further adding 10 part of proline (isoelectric point: 6.3) as amino acid.

The viscosity ($\eta_{45}$) at 45° C. and the viscosity ($\eta_{15}$) at 15° C. of Coating liquid 8 for high refractive index layer prepared above were measured by B type viscometer, and $\eta_{15}/\eta_{45}$ was calculated to be 285.7.

[Production of Sample 12Inventive Example]

Sample 12 was produced by coating 10 layers simultaneously in the same manner as the production of the above mentioned Sample 7, except for changing to the following Coating liquid 9 for high refractive index layer and forming High refractive index layer 9, instead of Coating liquid 4 for high refractive index layer used for forming High refractive index layer 4.

(Preparation of Coating Liquid 9 for High Refractive Index Layer)

Coating liquid 9 for high refractive index layer was prepared in the same manner as the preparation of above mentioned Coating liquid 4 for high refractive index layer, except for adding 1.0 part of L-cysteine (isoelectric point: 5.05) as amino acid and further using rutile type titan oxide particle sol prepared by changing an acid to concentrated hydrochloric acid instead of concentrated nitric acid.

The viscosity ($\eta_{45}$) at 45° C. and the viscosity ($\eta_{15}$) at 15° C. of Coating liquid 9 for high refractive index layer prepared above were measured by B type viscometer, and $\eta_{15}/\eta_{45}$ was calculated to be 400.0.

[Production of Sample 13Inventive Example]

Sample 13 was produced by coating 10 layers simultaneously in the same manner as the production of the above mentioned Sample 7, except for changing to the following Coating liquid 10 for high refractive index layer and forming High refractive index layer 10, instead of Coating liquid 4 for high refractive index layer used for forming High refractive index layer 4.

(Preparation of Coating Liquid 10 for High Refractive Index Layer)

Coating liquid 10 for high refractive index layer was prepared in the same manner as the preparation of above mentioned Coating liquid 4 for high refractive index layer, except for further adding 10 part of glycine (isoelectric point: 5.97) as amino acid.

The viscosity ($\eta_{45}$) at 45° C. and the viscosity ($\eta_{15}$) at 15° C. of Coating liquid 10 for high refractive index layer prepared above were measured by B type viscometer, and $\eta_{15}/\eta_{45}$ was calculated to be 1200.

[Production of Sample 14Inventive Example]

Sample 14 was produced by coating 10 layers simultaneously in the same manner as the production of the above mentioned Sample 7, except for changing to the following Coating liquid 11 for high refractive index layer and forming High refractive index layer 11, instead of Coating liquid 4 for high refractive index layer used for forming High refractive index layer 4.

(Preparation of Coating Liquid 11 for High Refractive Index Layer)

Coating liquid 11 for high refractive index layer was prepared in the same manner as the preparation of above mentioned Coating liquid 4 for high refractive index layer, except for further adding 10 part of serine (isoelectric point: 5.68) as amino acid.

The viscosity ($\eta_{45}$) at 45° C. and the viscosity ($\eta_{15}$) at 15° C. of Coating liquid 11 for high refractive index layer prepared above were measured by B type viscometer, and $\eta_{15}/\eta_{45}$ was calculated to be 600.

[Production of Sample 15Inventive Example]

Sample 15 was produced by coating 10 layers simultaneously in the same manner as the production of the above mentioned Sample 13, except for changing to the following Coating liquid 12 for high refractive index layer and forming High refractive index layer 12, instead of Coating liquid 10 for high refractive index layer used for forming High refractive index layer 10.

(Preparation of Coating Liquid 12 for High Refractive Index Layer)

Coating liquid 12 for high refractive index layer was prepared in the same manner as the preparation of above mentioned Coating liquid 10 for high refractive index layer, except for changing 4.0 parts of gellan gum as polysaccharide thickener instead of 4.0 parts of polyvinyl alcohol (PVA235 produced by Kuraray Co., Ltd.).

The viscosity ($\eta_{45}$) at 45° C. and the viscosity ($\eta_{15}$) at 15° C. of Coating liquid 12 for high refractive index layer prepared above were measured by B type viscometer, and $\eta_{15}/\eta_{45}$ was calculated to be 1,000.

[Production of Sample 16Inventive Example]

Sample 16 was produced by coating 10 layers simultaneously in the same manner as the production of the above mentioned Sample 13, except for changing to the following Coating liquid 13 for high refractive index layer and forming High refractive index layer 13, instead of Coating liquid 10 for high refractive index layer used for forming High refractive index layer 10.

(Preparation of Coating Liquid 13 for High Refractive Index Layer)

Coating liquid 13 for high refractive index layer was prepared in the same manner as the preparation of above mentioned Coating liquid 10 for high refractive index layer, except for changing to 2.0 parts of gellan gum and 2.0 parts of locust bean gum as polysaccharide thickener instead of 4.0 parts of polyvinyl alcohol (PVA235 produced by Kuraray Co., Ltd.).

The viscosity ($\eta_{45}$) at 45° C. and the viscosity ($\eta_{15}$) at 15° C. of Coating liquid 13 for high refractive index layer prepared above were measured by B type viscometer, and $\eta_{15}/\eta_{45}$ was calculated to be 600.

[Production of Sample 17 Inventive Example]

Sample 17 was produced by coating 10 layers simultaneously in the same manner as the production of the above mentioned Sample 14, except for changing to the following Coating liquid 14 for high refractive index layer and forming High refractive index layer 14, instead of Coating liquid 11 for high refractive index layer used for forming High refractive index layer 11.

(Preparation of Coating Liquid 14 for High Refractive Index Layer)

Coating liquid 14 for high refractive index layer was prepared in the same manner as the preparation of above mentioned Coating liquid 11 for high refractive index layer, except for changing to 2.0 parts of chitosan and 2.0 parts of locust bean gum as polysaccharide thickener instead of 4.0 parts of polyvinyl alcohol (PVA235 produced by Kuraray Co., Ltd.).

The viscosity ($\eta_{45}$) at 45° C. and the viscosity ($\eta_{15}$) at 15° C. of Coating liquid 14 for high refractive index layer prepared above were measured by B type viscometer, and $\eta_{15}/\eta_{45}$ was calculated to be 1,000.

[Production of Sample 18 Inventive Example]

Sample 18 was produced by coating 10 layers simultaneously in the same manner as the production of the above mentioned Sample 14, except for changing to the following Coating liquid 15 for high refractive index layer and forming High refractive index layer 15, instead of Coating liquid 11 for high refractive index layer used for forming High refractive index layer 11.

(Preparation of Coating Liquid 15 for High Refractive Index Layer)

Coating liquid 15 for high refractive index layer was prepared in the same manner as the preparation of above mentioned Coating liquid 11 for high refractive index layer, except for changing to 4.0 parts of pig skin acid treated gelatin instead of 4.0 parts of polyvinyl alcohol (PVA235 produced by Kuraray Co., Ltd.).

The viscosity ($\eta_{45}$) at 45° C. and the viscosity ($\eta_{15}$) at 15° C. of Coating liquid 15 for high refractive index layer prepared above were measured by B type viscometer, and $\eta_{15}/\eta_{45}$ was calculated to be 1,000.

[Production of Sample 19 Inventive Example]

Sample 19 was produced by coating 10 layers simultaneously in the same manner as the production of the above mentioned Sample 7, except for changing to the following Coating liquid 16 for high refractive index layer and forming High refractive index layer 16, instead of Coating liquid 4 for high refractive index layer used for forming High refractive index layer 4.

(Preparation of Coating Liquid 16 for High Refractive Index Layer)

Coating liquid 16 for high refractive index layer was prepared in the same manner as the preparation of above mentioned Coating liquid 4 for high refractive index layer, except for changing the content of polyvinyl alcohol (PVA203 produced by Kuraray Co., Ltd.) to 1.0 parts and polyvinyl alcohol (PVA235 produced by Kuraray Co., Ltd.) to 7.0 parts.

The viscosity ($\eta_{45}$) at 45° C. and the viscosity ($\eta_{15}$) at 15° C. of Coating liquid 16 for high refractive index layer prepared above were measured by B type viscometer, and $\eta_{15}/\eta_{45}$ was calculated to be 2,518.

[Production of Sample 20 Inventive Example]

Sample 20 was produced in the same manner as the production of the above mentioned Sample 7, except for changing to the following Coating liquid 17 for high refractive index layer and forming High refractive index layer 17, instead of Coating liquid 4 for high refractive index layer used for forming High refractive index layer 4.

(Preparation of Coating Liquid 17 for High Refractive Index Layer)

Coating liquid 17 for high refractive index layer was prepared in the same manner as the preparation of above mentioned Coating liquid 4 for high refractive index layer, except for changing the content of polyvinyl alcohol (PVA203 produced by Kuraray Co., Ltd.) to 2.0 parts and further adding 6.0 parts of polyvinyl alcohol (JP-45, polymerization degree: 4,500, saponification degree: 86.5-89.5%, produced by JAPAN VAM & POVAL CO., LTD.) instead of polyvinyl alcohol (PVA235 produced by Kuraray Co., Ltd.).

The viscosity ($\eta_{45}$) at 45° C. and the viscosity ($\eta_{15}$) at 15° C. of Coating liquid 17 for high refractive index layer prepared above were measured by B type viscometer, and $\eta_{15}/\eta_{45}$ was calculated to be 3,522.

[Production of Sample 21 Inventive Example]

Sample 21 was produced in the same manner as the production of the above mentioned Sample 7, except for changing to the following Coating liquid 18 for high refractive index layer and forming High refractive index layer 18, instead of Coating liquid 4 for high refractive index layer used for forming High refractive index layer 4.

(Preparation of Coating Liquid 18 for High Refractive Index Layer)

Coating liquid 18 for high refractive index layer was prepared in the same manner as the preparation of above mentioned Coating liquid 4 for high refractive index layer, except for changing the content of polyvinyl alcohol (PVA203 produced by Kuraray Co., Ltd.) to 1.0 parts and further adding 7.0 parts of polyvinyl alcohol (JP-45, polymerization degree: 4,500, saponification degree: 86.5-89.5%, produced by JAPAN VAM & POVAL CO., LTD.) instead of polyvinyl alcohol (PVA235 produced by Kuraray Co., Ltd.).

The viscosity (w) at 45° C. and the viscosity ($\eta_{15}$) at 15° C. of Coating liquid 18 for high refractive index layer prepared above were measured by B type viscometer, and $\eta_{15}/\eta_{45}$ was calculated to be 4,797.

[Production of Sample 22 Inventive Example]

Sample 22 was produced in the same manner as the production of the above mentioned Sample 7, except for changing to the following Coating liquid D for low refractive index layer and forming Low refractive index layer D, instead of Coating liquid C for low refractive index layer used for forming Low refractive index layer C.

(Preparation of Coating Liquid D for Low Refractive Index Layer)

Into 5 parts of water, 1.0 parts of polyvinyl alcohol (PVA203 produced by Kuraray Co., Ltd.) was dissolved, then 5.0 parts of 1:2 mixture of 1.0% by mass of boric acid aqueous solution and 4.0% by mass of borax aqueous solution was added wherein pH of the mixture was adjusted to 3.5 with nitric acid. Then, 100 parts of silica sol (Silicadol 20P produced by Nippon Chemical Industrial Co., Ltd.) and polyvinyl alcohol solution in which 7.0 parts of polyvinyl alcohol (PVA235 produced by Kuraray Co., Ltd.) was dissolved into 45 parts of water were added followed by measuring up to 250 parts with water and Coating liquid D for low refractive index layer was prepared.

The viscosity ($\eta_{45}$) at 45° C. and the viscosity ($\eta_{15}$) at 15° C. of Coating liquid D for low refractive index layer prepared above were measured by B type viscometer, and $\eta_{15}/\eta_{45}$ was calculated to be 480.

[Production of Sample 23 Inventive Example]

Sample 23 was produced in the same manner as the production of the above mentioned Sample 7, except for changing to the following Coating liquid E for low refractive index layer and forming Low refractive index layer E, instead of Coating liquid C for low refractive index layer used for forming Low refractive index layer C.

(Preparation of Coating Liquid E for Low Refractive Index Layer)

Into 5 parts of water, 1.0 parts of polyvinyl alcohol (PVA203 produced by Kuraray Co., Ltd.) was dissolved, then 5.0 parts of 1:2 mixture of 1.0% by mass of boric acid aqueous solution and 4.0% by mass of borax aqueous solution was added wherein pH of the mixture was adjusted to 3.5 with nitric acid. Then, 100 parts of silica sol (Silicadol 20P produced by Nippon Chemical Industrial Co., Ltd.) and polyvinyl alcohol solution in which 7.0 parts of polyvinyl alcohol (JP-45, polymerization degree: 4,500, saponification degree: 86.5-89.5%, produced by JAPAN VAM & POVAL CO., LTD.) was dissolved into 45 parts of water were added followed by measuring up to 250 parts with water and Coating liquid E for low refractive index layer was prepared.

The viscosity ($\eta_{45}$) at 45° C. and the viscosity ($\eta_{15}$) at 15° C. of Coating liquid E for low refractive index layer prepared above were measured by B type viscometer, and $\eta_{15}/\eta_{45}$ was calculated to be 1,024.

The fundamental constitutions of Samples 1-23 which are the above prepared near-infrared reflective films are shown in Tables 1 and 2.

TABLE 1

| | | | | High refractive index layer | | | | | |
|---|---|---|---|---|---|---|---|---|---|
| Sample No. | Coating liquid No. | Inorganic particles | Water soluble polymer | Polysaccharide thickener & others | Amino acid | Viscosity ratio $\eta_{15}/\eta_{45}$ | Average refractive index $n_H$ | Dry thickness (nm) | Remarks |
| 1 | 1 | Titanium oxide | *1 | — | — | 1.8 | 2.10 | 118 | Comp. |
| 2 | 2 | Zirconia | PVA203 | — | — | 2.3 | 1.73 | 143 | Comp. |
| 3 | 3 | Zirconia | PVA203 + PVA235 | — | — | 114.3 | 1.74 | 142 | Comp. |
| 4 | 2 | Zirconia | PVA203 | — | — | 2.3 | 1.73 | 143 | Inv. |
| 5 | 2 | Zirconia | PVA203 | — | — | 2.3 | 1.73 | 143 | Inv. |
| 6 | 3 | Zirconia | PVA203 + PVA235 | — | — | 114.3 | 1.74 | 142 | Inv. |
| 7 | 4 | Titania sol | PVA203 + PVA235 | — | — | 105.0 | 1.89 | 131 | Inv. |
| 8 | 5 | Titania sol | PVA203 + PVA235 | — | — | 120.0 | 1.90 | 130 | Inv. |
| 9 | 6 | Titania sol | PVA203 + PVA235 | — | histidine | 144.4 | 1.90 | 130 | Inv. |
| 10 | 7 | Titania sol | PVA203 + PVA235 | — | lysine | 177.8 | 1.92 | 129 | Inv. |
| 11 | 8 | Titania sol | PVA203 + PVA235 | — | glycine | 285.7 | 1.91 | 130 | Inv. |
| 12 | 9 | Titania sol | PVA203 + PVA235 | — | L-systeine | 400.0 | 1.90 | 130 | Inv. |
| 13 | 10 | Titania sol | PVA203 + PVA235 | — | hydroxyproline | 1200.0 | 1.92 | 129 | Inv. |
| 14 | 11 | Titania sol | PVA203 + PVA235 | — | serine | 600.0 | 1.91 | 130 | Inv. |
| 15 | 12 | Titania sol | PVA217 | Gellan gum | glycine | 1000.0 | 1.92 | 129 | Inv. |
| 16 | 13 | Titania sol | PVA217 | *2 | glycine | 600.0 | 1.94 | 128 | Inv. |
| 17 | 14 | Titania sol | PVA217 | *3 | serine | 1000.0 | 1.94 | 128 | Inv. |
| 18 | 15 | Titania sol | PVA217 | Pig skin acid treated gelatin | serine | 1000.0 | 1.96 | 126 | Inv. |
| 19 | 16 | Titania sol | PVA203 + PVA235 | — | — | 2518.0 | 1.89 | 131 | Inv. |
| 20 | 17 | Titania sol | PVA203 + PVA235 | — | — | 3522.0 | 1.89 | 131 | Inv. |
| 21 | 18 | Titania sol | PVA203 + PVA235 | — | — | 4797.0 | 1.89 | 131 | Inv. |
| 22 | 4 | Titania sol | PVA203 + PVA235 | — | — | 105.0 | 1.89 | 131 | Inv. |
| 23 | 4 | Titania sol | PVA203 + PVA235 | — | — | 105.0 | 1.89 | 131 | Inv. |

*1: 4,4'-bis(β-methacryloyl oxyethylthio) diphenylsulfone
*2: Gellan gum + locust bean gum
*3: chitosan + locust bean gum

TABLE 2

| | | | Low refractive index layer | | | | | |
|---|---|---|---|---|---|---|---|---|
| Sample No. | Coating liquid No. | Inorganic particle | Water soluble polymer | Viscosity ratio $\eta_{15}/\eta_{45}$ | Average refractive index $n_L$ | Dry thickness (nm) | *1 $n_H$-$n_L$ | Remarks |
| 1 | A | — | PVA117 | 1.8 | 1.52 | 163 | 0.58 | Comp. |
| 2 | A | — | PVA117 | 1.8 | 1.52 | 163 | 0.21 | Comp. |
| 3 | A | — | PVA117 | 1.8 | 1.52 | 163 | 0.22 | Comp. |
| 4 | B | Silica | PVA203 | 6.0 | 1.38 | 179 | 0.35 | Inv. |
| 5 | C | Silica | PVA203 + PVA235 | 177.8 | 1.40 | 177 | 0.33 | Inv. |
| 6 | C | Silica | PVA203 + PVA235 | 177.8 | 1.40 | 177 | 0.34 | Inv. |
| 7 | C | Silica | PVA203 + PVA235 | 177.8 | 1.40 | 177 | 0.49 | Inv. |
| 8 | C | Silica | PVA203 + PVA235 | 177.8 | 1.40 | 177 | 0.50 | Inv. |
| 9 | C | Silica | PVA203 + PVA235 | 177.8 | 1.40 | 177 | 0.50 | Inv. |
| 10 | C | Silica | PVA203 + PVA235 | 177.8 | 1.40 | 177 | 0.52 | Inv. |
| 11 | C | Silica | PVA203 + PVA235 | 177.8 | 1.40 | 177 | 0.51 | Inv. |

TABLE 2-continued

| | | | Low refractive index layer | | | | | |
|---|---|---|---|---|---|---|---|---|
| Sample No. | Coating liquid No. | Inorganic particle | Water soluble polymer | Viscosity ratio $\eta_{15}/\eta_{45}$ | Average refractive index $n_L$ | Dry thickness (nm) | *1 $n_H-n_L$ | Remarks |
| 12 | C | Silica | PVA203 + PVA235 | 177.8 | 1.40 | 177 | 0.50 | Inv. |
| 13 | C | Silica | PVA203 + PVA235 | 177.8 | 1.40 | 177 | 0.52 | Inv. |
| 14 | C | Silica | PVA203 + PVA235 | 177.8 | 1.40 | 177 | 0.51 | Inv. |
| 15 | C | Silica | PVA203 + PVA235 | 177.8 | 1.40 | 177 | 0.52 | Inv. |
| 16 | C | Silica | PVA203 + PVA235 | 177.8 | 1.40 | 177 | 0.54 | Inv. |
| 17 | C | Silica | PVA203 + PVA235 | 177.8 | 1.40 | 177 | 0.54 | Inv. |
| 18 | C | Silica | PVA203 + PVA235 | 177.8 | 1.40 | 177 | 0.56 | Inv. |
| 19 | C | Silica | PVA203 + PVA235 | 177.8 | 1.40 | 177 | 0.49 | Inv. |
| 20 | C | Silica | PVA203 + PVA235 | 177.8 | 1.40 | 177 | 0.49 | Inv. |
| 21 | C | Silica | PVA203 + PVA235 | 177.8 | 1.40 | 177 | 0.49 | Inv. |
| 22 | D | Silica | PVA203 + PVA235 | 483.0 | 1.40 | 177 | 0.49 | Inv. |
| 23 | E | Silica | PVA203 + PVA235 | 1024.0 | 1.40 | 177 | 0.49 | Inv. |

*1: Difference of refractive index between High refractive index layer and Low refractive index layer

[Evaluation of Near-infrared Reflective Film]

According to the following method, the characteristics of the above prepared near-infrared reflective film were measured and evaluated.

(Measurement of Average Refractive Index of Each Layer)

The samples of each refractive index layer for measuring a refractive index were prepared as single layer by coating on the support and cutting to the size of 10 cm×10 cm. Refractive index of each layer was determined according to the following method.

In order to prevent the light reflection from the back side, the back side of each sample was processed by roughening and spraying to black for light absorbing treatment. By using spectrophotometer U-4000 type (produced by Hitachi, Ltd.), reflectances of a visible light region (400 nm-700 nm) were measured at 25 points under the condition of 5° specular reflection, and the average of the measurement results was calculated to be the average refractive index.

(Evaluation of Resistance to Refractive Index Unevenness (Coating Uniformity) of Refractive Index Layer)

Above prepared near-infrared reflective film was cut to 10 cm×10 cm, and 25 blocks in all were formed by marking 5×5 at intervals of 2 cm in all directions. Resistance to refractive index unevenness was evaluated by observation of occurrence of interference unevenness (iridescent unevenness) by observation from the front and from the angle of 45° of the near-infrared reflective film. The resistance to refractive index unevenness was evaluated in accordance with the following criteria.

5: No interference unevenness was observed in all of 25 blocks.

4: Slight interference unevenness was observed in 1 block of 25 blocks.

3: Interference unevenness was observed in 2-5 blocks of 25 blocks.

2: Interference unevenness was observed in 6-10 blocks of 25 blocks.

1: Strong interference unevenness was observed in 11 or more blocks of 25 blocks.

Obtained results of the measurement and evaluation will be shown in Table 3.

TABLE 3

| | Resistance to Refractive index unevenness | | |
|---|---|---|---|
| Sample No. | From front | From angle | Remarks |
| 1 | 1 | 1 | Comp. |
| 2 | 1 | 1 | Comp. |
| 3 | 1 | 1 | Comp. |
| 4 | 3 | 3 | Inv. |
| 5 | 3 | 3 | Inv. |
| 6 | 4 | 3 | Inv. |
| 7 | 4 | 3 | Inv. |
| 8 | 4 | 3 | Inv. |
| 9 | 4 | 4 | Inv. |
| 10 | 4 | 4 | Inv. |
| 11 | 4 | 4 | Inv. |
| 12 | 4 | 4 | Inv. |
| 13 | 5 | 4 | Inv. |
| 14 | 5 | 4 | Inv. |
| 15 | 5 | 5 | Inv. |
| 16 | 5 | 5 | Inv. |
| 17 | 5 | 5 | Inv. |
| 18 | 5 | 5 | Inv. |
| 19 | 4 | 3 | Inv. |
| 20 | 4 | 3 | Inv. |
| 21 | 4 | 3 | Inv. |
| 22 | 4 | 3 | Inv. |
| 23 | 4 | 3 | Inv. |

Inv.: Inventive example, Comp.: Comparative example

As can clearly be seen from Table 3, the near-infrared reflective films according to the present invention were superior to Comparative Examples in each of the resistance to refractive index unevenness of the refractive index layer, and to have higher layer uniformity.

Example 2

[Production of Near-infrared Reflective Body 1]

The near-infrared reflective body 1 was produced by using the near-infrared reflective film of Sample 8 produced in Example 1. On a transparent acrylate resin board with thickness of 5 mm, 20 cm×20 cm, the near-infrared reflective film of Sample 8 was adhered with acryl adhesive, and the near-infrared reflective body 1 was produced.

[Production of Near-infrared Reflective Body 2]

The near-infrared reflective body 2 was produced by using the near-infrared reflective film of Sample 15 described in Example 1. On both sides of the near-infrared reflective film of Sample 15, polyvinyl butyral of 0.5 mm thickness were arranged, and resulting laminated body was sandwiched between two plate glass having 2 mm of thickness, 20 cm×20 cm, and then performing pressurization heat-treatment and Near-infrared reflective body 2 was produced as the laminated glass.

[Evaluation]

Above produced near-infrared reflective bodies 1 and 2 show that the near-infrared reflective film can be applicable to the near-infrared reflective body. Even though the size of a near-infrared reflective body is large, it is confirmed that the near-infrared reflective film can be used easily to manufacture such near-infrared reflective body and exhibits excellent near-infrared reflection according to use the near-infrared reflective film.

What is claimed is:

1. A method for manufacturing a near-infrared reflective film, comprising:
    controlling a viscosity ratio ($\eta_{15}/\eta_{45}$) of both of a high refractive index layer coating liquid and a low refractive index layer coating liquid so as to be not less than 2.0; and
    laminating high refractive index layers and low refractive index layers alternately on a support with the high refractive index layer coating liquid and the low refractive index layer coating liquid so as to form the near-infrared reflective film,
    wherein the difference in the refractive index of the adjacent high refractive index layer and the low refractive index layer is at least 0.3, and
    wherein $\eta_{15}$ represents a viscosity of the high refractive index layer coating liquid and the low refractive index layer coating liquid at 15° C. and $\eta_{45}$ represents a viscosity of the high refractive index layer coating liquid and the low refractive index layer coating liquid at 45° C.

2. The method for manufacturing the near-infrared reflective film of claim 1, wherein the high refractive index layer coating liquid and the low refractive index layer coating liquid have the viscosity ratio ($\eta_{15}/\eta_{45}$) of not less than 100.

3. The method for manufacturing the near-infrared reflective film of claim 2, wherein the high refractive index layer contains a rutile titania sol as a metal oxide.

4. The method for manufacturing the near-infrared reflective film of claim 1, wherein the high refractive index layer contains a rutile titania sol as a metal oxide.

5. The method for manufacturing the near-infrared reflective film of claim 4, wherein the high refractive index layer contains an amino acid having an isoelectric point of not more than 6.5.

6. The method for manufacturing the near-infrared reflective film of claim 4, wherein the high refractive index layer coating liquid and the low refractive index layer coating liquid contain a polyvinyl alcohol.

7. The method for manufacturing the near-infrared reflective film of claim 1, wherein the high refractive index layer contains an amino acid having an isoelectric point of not more than 6.5.

8. The method for manufacturing the near-infrared reflective film of claim 1, wherein the high refractive index layer coating liquid and the low refractive index layer coating liquid contain a polyvinyl alcohol.

9. The method for manufacturing the near-infrared reflective film of claim 8, wherein at least one of the low refractive index layer coating liquid or the high refractive index layer coating liquid contains a plurality species of polyvinyl alcohols.

10. The method for manufacturing the near-infrared reflective film of claim 9, wherein the low refractive index layer coating liquid contains a plurality species of polyvinyl alcohols.

11. The method for manufacturing the near-infrared reflective film of claim 1, wherein both of the high refractive index layer coating liquid and the low refractive index layer coating liquid contain a polysaccharide thickener or a gelatin.

12. The method for manufacturing the near-infrared reflective film of claim 1, wherein the viscosity ratio ($\eta_{15}/\eta_{45}$) is not more than 5,000.

13. The method for manufacturing the near-infrared reflective film of claim 1, wherein the high refractive index layer and the low refractive index layer are alternately laminated by a simultaneous multilayer coating using the high refractive index layer coating liquid and the low refractive index layer coating liquid.

14. The method for manufacturing the near-infrared reflective film of claim 1, wherein a viscosity of the high refractive index layer and the low refractive index layer at 45° C. is 5-100 mPa·s and the viscosity at 15° C. is 5-500 mPa·s.

15. A method for manufacturing a near-infrared reflective film, comprising:
    controlling a viscosity ratio ($\eta_{15}/\eta_{45}$) of both of a high refractive index layer coating liquid and a low refractive index layer coating liquid so as to be not less than 2.0; and
    laminating a high refractive index layer and a low refractive index layer alternately on a substrate by a simultaneous multilayer coating using the high refractive index layer coating liquid and the low refractive index layer coating liquid so as to form the near-infrared infrared reflective film,
    wherein $\eta_{15}$ represents a viscosity of the high refractive index layer and the low refractive index layer at 15° C. and $\eta_{45}$ represents a viscosity at 45°C., and
    at least one of the low refractive index layer coating liquid or the high refractive index layer coating liquid contains a plurality species of polyvinyl alcohols.

16. The method for manufacturing the near-infrared reflective film of claim 15, wherein the high refractive index layer coating liquid contains a titania sol.

17. The method for manufacturing the near-infrared reflective film of claim 16, wherein the high refractive index layer contains an amino acid having an isoelectric uoint of not more than 6.5.

18. The method for manufacturing the near-infrared reflective film of claim 17, wherein the viscosity ratio ($\eta_{15}/\eta_{45}$) is not less than 50 and not more than 5,000.

19. The method for manufacturing the near-infrared reflective film of claim 15, wherein the low refractive index layer coating liquid and the high refractive index layer coating liquid are simultaneous multilayer coated after a temperature of the both coating liquids are not less than 30° C.

20. A near-infrared reflective body comprising the near-infrared reflective film manufactured by the method of claim 1 on at least one side of the support.

* * * * *